United States Patent [19]

Amy et al.

[11] Patent Number: 4,693,102

[45] Date of Patent: Sep. 15, 1987

[54] SHOT-PEENING METHOD

[75] Inventors: A. André Amy, Lafayette; Jules Babineaux, Scott, both of La.

[73] Assignee: Metal Improvement Co., Inc., Paramus, N.J.

[21] Appl. No.: 795,175

[22] Filed: Nov. 5, 1985

[51] Int. Cl.[4] .................................................. B24C 1/10
[52] U.S. Cl. .......................................... 72/53; 51/415; 51/320
[58] Field of Search ................... 72/53; 29/90 A, 407; 51/415, 319, 416, 320; 364/472

[56] References Cited

U.S. PATENT DOCUMENTS 3,073,022  1/1963  Bush et al. ............................. 72/53

OTHER PUBLICATIONS

Michael Woelfel and Robert Mulhall, "Glass Bead Impact Blasting", Sep. 1982, vol. 122, No. 4, pp. 57-59.
The Airless Wheelabrator What it is—and What it Will Do", American Foundry Equipment Co., 3/1946, p. 10.

Primary Examiner—Robert L. Spruill
Assistant Examiner—David B. Jones

[57] ABSTRACT

A method for controlling the flow in a shot-peening apparatus, comprising an auger having an inlet supplied with granular media via a hopper, the auger preferably being driven by a stepping motor, for advancing the media fed into the inlet at a precisely controlled rate to a discharge conduit. The motor is controlled by a computer to cause a programmed amount of flow to discharge from the discharge conduit. A proximity sensor, preferably of the capacitive type, is provided in the discharge conduit to detect if the discharge is blocked. The motor and auger may be replaced by a vibrating feeder.

3 Claims, 3 Drawing Figures

4,693,102

SHOT-PEENING METHOD

BACKGROUND OF THE INVENTION

The present invention relates to a method of and apparatus for controlling the flow of granular media, and more particularly, the flow of metallic granular media in shot-peening equipment. Such shot-peening equipment may handle magnetic or non-magnetic, ferrous or non-ferrous, and other, media.

Devices currently available and used to control flow in shot-peening equipment are limited to magnetic materials. For instance, a permanent magnet is placed in the conduit supplying the shot, and a so-called bucking coil is used to overcome the magnet's field to allow magnetic media to flow, or actually fall by gravity. A magnetic-type mass flow sensor located below this assembly provides flow information to an electronic control which adjusts the power to the bucking coil.

Presently, there exists no method of or means for non-destructively inspecting the quality of shot-peened areas of a component or article. Therefore, the value of the shot-peening process is limited by the degree of confidence the user has in the process itself.

Some existing machinery of the latest design utilizes some elements of current technology to control some aspects of the process but, to date, there has been no overall process that utilizes the full benefits of shot-peening.

BRIEF SUMMARY OF THE INVENTION

The present invention provides a novel apparatus for controlling the flow in a shot-peening apparatus. It comprises an auger having an inlet supplied with granular media via a hopper, the auger being driven preferably by a motor of a special type, namely a stepping motor, for advancing the media fed into the inlet at a precisely controlled rate to a discharge conduit. The stepping motor is controlled by a computer to cause a programmed amount of flow to discharge from the discharge conduit. In the discharge conduit there is provided a sensor of a specific type, a proximity sensor, preferably of the capacitive type, to detect if the discharge is blocked because it is full of granular media, or if the stepping motor or auger or inlet is blocked, in which case the discharge rate from the discharge conduit is less than the minimum for which the machine and the controls are designed.

BRIEF DESCRIPTION OF THE DRAWINGS

The invention is illustrated, by way of example, in the attached drawings, in which.

DETAILED DESCRIPTION OF PREFERRED EMBODIMENTS

Figure 1:
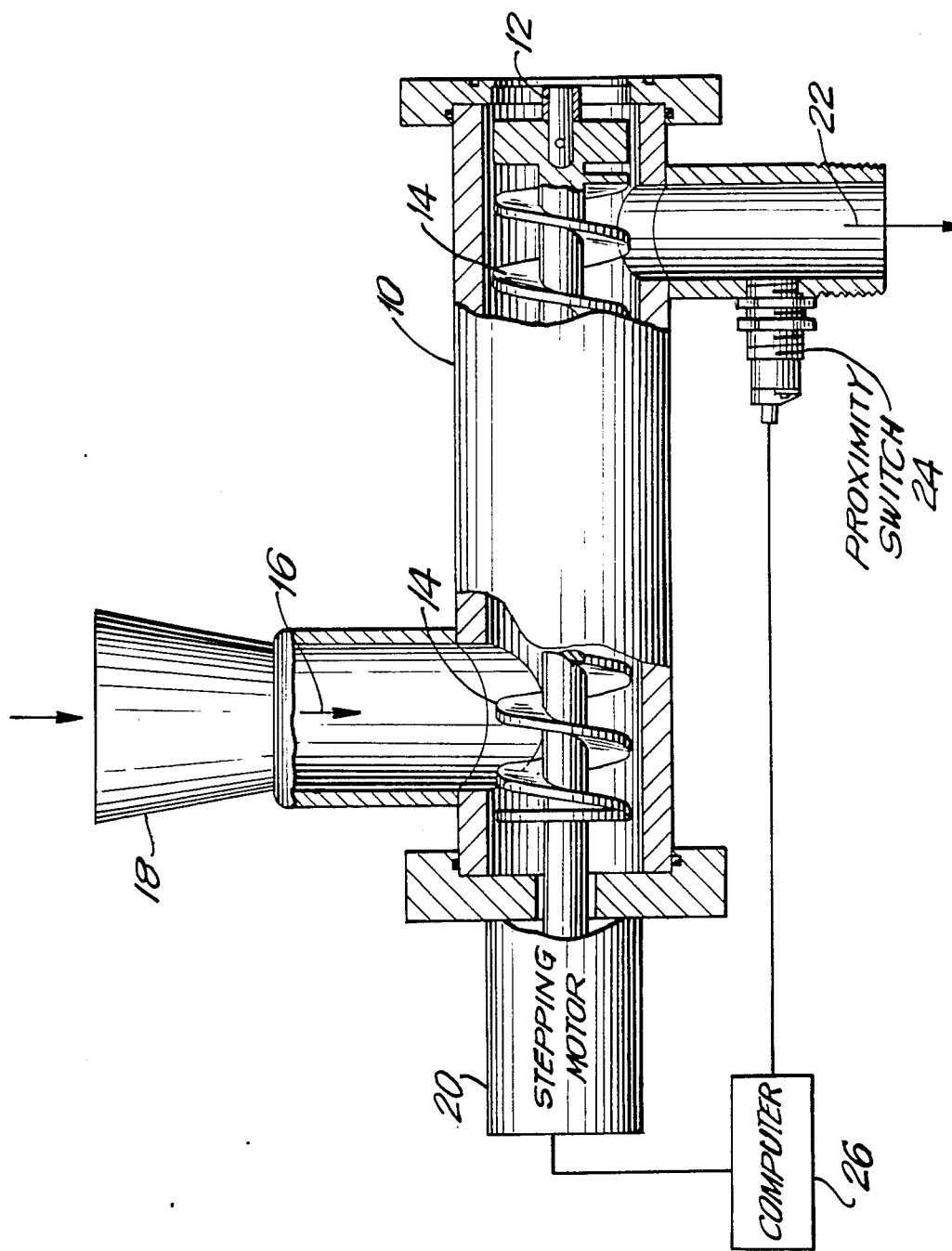
FIG. 1 is a view, partly in section, of the flow control apparatus of the shot-peening machine according to the present invention.

The flow control part of a first embodiment of the shot-peening apparatus according to the present invention is illustrated in FIG. 1. It comprises a housing 10 and an auger 14. The housing is provided with an inlet conduit 16 below a hopper 18, and with a discharge conduit 22. Auger 14 is rotatably journalled in a bearing 12 and is driven by a stepping motor 20. A proximity sensor 24 is mounted in conduit 22.

Auger 14 is an archimedes screw, or similar element, for translating the granular material from the inlet 16 to the discharge 22. The feed rate of the auger is governed by the rotational speed, pitch, and size of the screw, which in turn determines the so-called bulk density range of the device. As an example, gravity fed nozzles typically operate with a bulk density range from approximately 5 to 25 pounds per minute with steel shot.

The auger could also be mounted in cantilevered fashion.

Stepping motors are preferred since they are readily and conveniently adaptable to digital control. A stepping motor translates electrical pulses into mechanical movements. The output shaft rotates or moves through a specific angular rotation per each incoming pulse. This angle per movement is repeated precisely with each succeeding pulse translated by appropriate drive circuitry. The result is a precise, fixed and repeatable movement. Stepping motor 20 is controlled by a computer 26 (FIG. 2) to cause a programmed amount to flow from discharge 22.

Other types of motors could be used, such as AC and DC electric motors, fluid power motors, or other devices that may impart a rotary motion to the auger.

The proximity sensor 24 may be of the magnetic, capacitive, or other suitable type. However, preferably a capacitive proximity sensor is used since it can be utilized with non-metallic, as well as magnetic material. For instance, a proximity switch may be used which is manufactured by General Equipment and Manufacturing Co.,Inc. under Model No. 3 CNO 2V DSN.

The proximity sensor monitors the feeding function of the auger, in the following manner:

With the feed rate operating at a minimum useable rate (e.g. 5 lbs/min.), the sensitivity of the sensor is adjusted so that the unit just begins to detect the passage of some particles, i.e., those closest to it. This condition causes the sensor to transmit electrical impulses to computer 26 which recognizes these as counts of passing particles. The unit alternately goes on and off as some particles near the sensor are detected. The lack of any signal will be classified by the control as a "no flow" condition.

As the feed rate is increased, the signal frequency increases, but continues to be alternately on and off. The control classifies this as a "normal flow" condition.

If the discharge becomes full, with no movement of the media, the sensor will not alternate the output signal. The control classifies this as an out of range condition.

Figure 2:
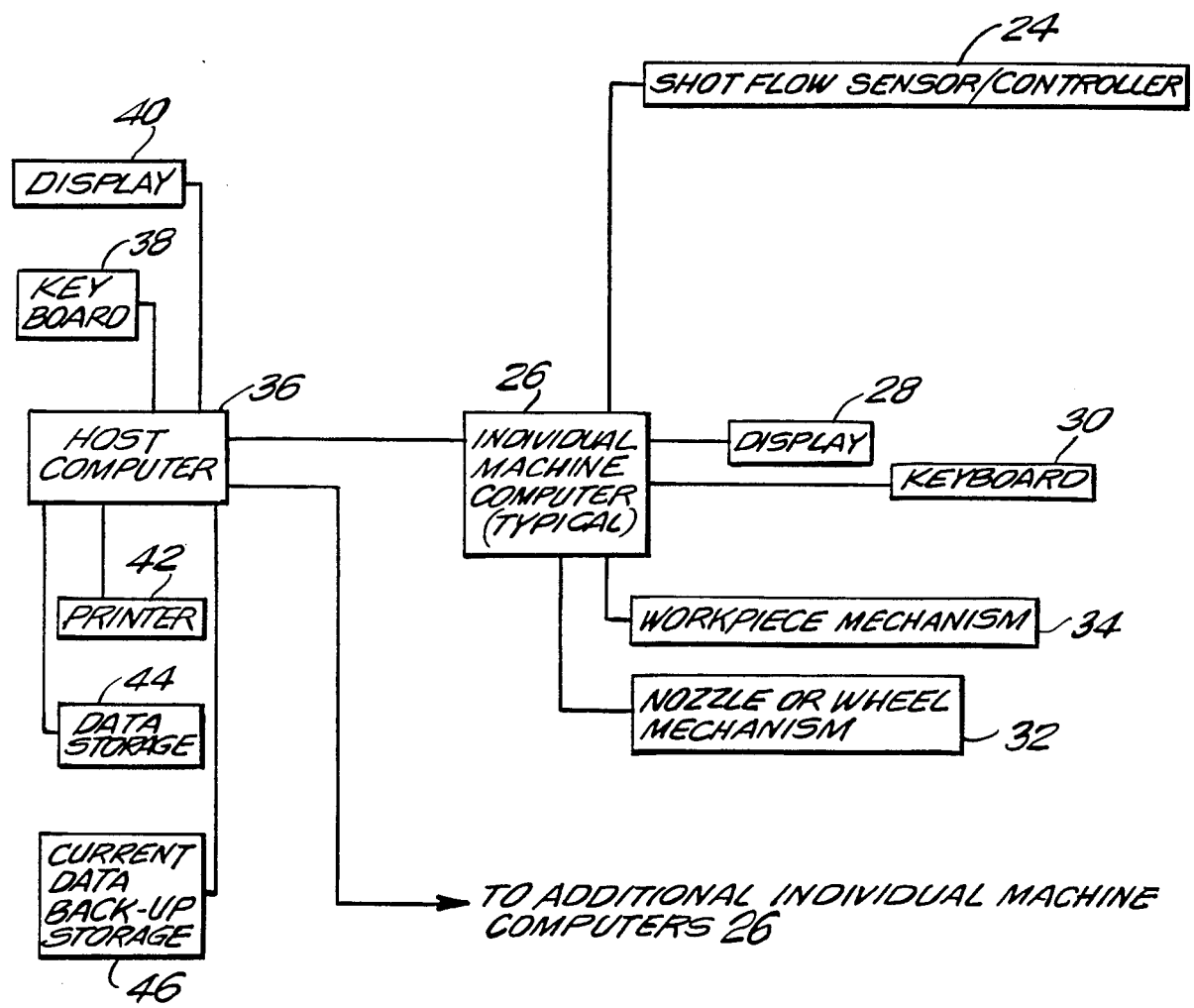
FIG. 2 is a diagrammatical illustration of the shot-peening machine.

As shown in FIG. 2, the shot flow sensor or controller 24 is connected to computer 26 having a display 28 and a keyboard 30. The entire shot-peening machine is electronically controlled. The supply of shot in hopper 18 is continuously monitored, as is the flow of shot from discharge 22. The flow is controlled by computer 26. The shot is supplied to a nozzle or wheel mechanism 32, and this is also monitored by computer 26, as is the condition of a workpiece mechanism 34 which presents the workpiece to the shot stream.

Several individual computers 26 are tied to a host computer 36 having a keyboard 38 and display 40 to monitor and control the individual machines. The host computer has associated therewith a printer 42, a data storage 44, and a current data back-up storage 46.

The host computer 36 monitors various machine operating parameters. These are established either manually from keyboard 38 or from data storage 44 and such data are stored and printed.

The shot-peening process according to the invention operates as follows. A component or article of a certain material, such as metal, is initially designed and then manufactured, and the article is subjected to a fatigue test. Such test will establish critical areas of the article and will also indicate which areas are to be subjected to shot-peening.

Thereafter, computer 26 is controlled and a machine with a nozzle or wheel mechanism 32 with the sensor 24 described above subjects the material to a shot-peening process and stores the results in a machine archive. Thereafter, further articles or components of the same design and manufacture are subjected to shot-peening and a fatigue test of the peened components is carried out, as mentioned above. If this fatigue test results in an unsatisfactory life of the article it is determined which items are in need of revision, i.e. whether they have to be redesigned, manufactured in a different manner, or shot-peened to a revised set of parameters.

Then, all the above mentioned steps are repeated until the life of the shot-peened article is satisfactory. The peening process procedures are stored in data storage 44 and the peening production data is stored/in data storage 46. All future articles are subjected to the same shot-peening process under the control of host computer 36 and individual computers 26.

Figure 3:
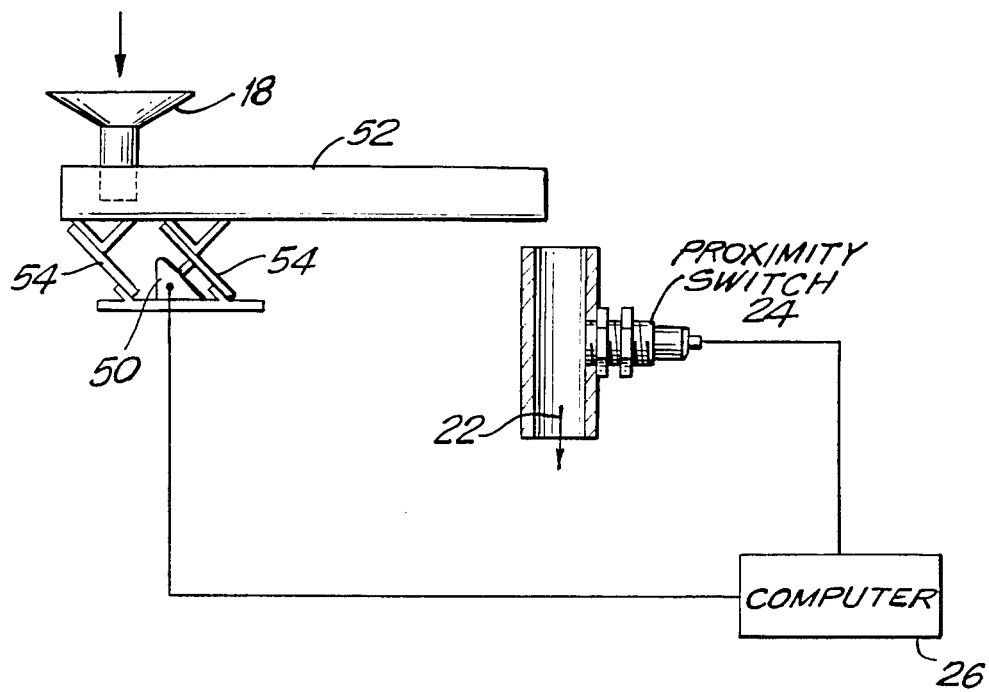
FIG. 3 shows another embodiment of a flow control apparatus of the invention.

FIG. 3 shows another embodiment of the flow control apparatus of the invention. Instead of a stepping motor and auger, the shot is advanced by a vibrating feeder having a driver part 50 and a feeding pan 52. Driver part 50 is basically an electromagnet controlled by computer 26. The pan is mounted on springs 54 arranged at an angle to the vertical and the shot is advanced in the pan in a "catch and toss motion" to discharge 22. This embodiment is suitable for high bulk density rates.

We claim:

1. A method of producing a series of essentially identical articles in shot-peening equipment having nozzles or wheels for subjecting the articles to shot-peening, comprising the steps of;
    (a) developing a set of critical shot-peening parameters yielding specified article properties;
    (b) rigidly controlling certain of said shot-peening parameters by using part holding fixtures, Almen strip fixtures, and nozzle fixtures;
    (c) continuously controlling shot media by segregating the media both by size and shape;
    (d) with a computer controlling, monitoring and documenting said certain critical shot-peening parameters;
    (e) with a computer also controlling said controlled shot-peening equipment such that said critical processing parameters stay within preselected maximum and minimum values;
    (f) shutting down the shot-peening equipment if the maximum or minimum values are exceeded;
    (g) keeping the equipment shut down unless all monitored parameters have been brought with the preselected maximum and minimum values;
    (h) documenting via computer print-out, time of any shut down, cause of any shut down, and successful completion of the process; and
    (i) documenting the monitored parameters throughout the process, start and successfully completion of process, the maximum and minimum values for each parameter monitored, movement of the nozzles, which nozzles are active, and identification of the articles shot-peened.

2. A method according to claim 1, wherein said shot-peening parameters are selected from the following: flow of shot, rotation of article, translation of article, rotation and translation of article, speed of wheel subjecting article to shot-peening, translation of nozzles or wheels, passing over or under the article subjected to shot-peening.

3. A method according to claim 1, wherein said shot-peening parameters are selected from the following: flow and pressure of air, rotation of article, translation of article, rotation and translation of article, speed of wheel subjecting article to shot-peening, translation of nozzles or wheels, passing over or under the article subjected to shot-peening.

* * * * *